United States Patent
Al-Mehthel et al.

(10) Patent No.: US 9,249,304 B2
(45) Date of Patent: Feb. 2, 2016

(54) HEAVY OIL ASH IN ROOFING, DAMP-PROOFING, AND WATER PROOFING APPLICATIONS

(71) Applicants: Saudi Arabian Oil Company, Dharan, SC (US); King Fahd University of Petroleum and Minerals, Dharan (SA)

(72) Inventors: Mohammed Al-Mehthel, Dhahran (SA); Hamad I. Al-Abdul Wahhab, Dhahran (SA); Saleh H. Al-Idi, Dhahran (SA); Ibnelwaleed A. Hussein, Dhahran (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 14/069,937

(22) Filed: Nov. 1, 2013

(65) Prior Publication Data

US 2015/0126648 A1 May 7, 2015

(51) Int. Cl.
| | |
|---|---|
| *C08L 95/00* | (2006.01) |
| *C08L 53/02* | (2006.01) |
| *C08L 31/04* | (2006.01) |
| *C04B 18/08* | (2006.01) |
| *C08K 11/00* | (2006.01) |
| *D06N 5/00* | (2006.01) |
| C08L 23/08 | (2006.01) |

(52) U.S. Cl.
CPC .............. *C08L 95/00* (2013.01); *C04B 18/087* (2013.01); *C08K 11/005* (2013.01); *C08L 53/02* (2013.01); *D06N 5/00* (2013.01); *C08L 23/0853* (2013.01)

(58) Field of Classification Search
CPC ......... C04B 24/36; C08L 95/00; C08L 53/02; C08L 31/04; C10C 3/00
USPC ........... 106/668, 281.1, 273.1; 524/59, 68, 69
See application file for complete search history.

(56) References Cited

U.S. PATENT DOCUMENTS

| | | | |
|---|---|---|---|
| 4,079,158 A | 3/1978 | Kennepohl et al. | |
| 4,135,022 A | 1/1979 | Kennepohl et al. | |
| 4,145,322 A | 3/1979 | Maldonado et al. | |
| 4,412,019 A | 10/1983 | Kraus | |
| 5,219,901 A | 6/1993 | Burke et al. | |
| 5,371,121 A | 12/1994 | Bellomy et al. | |
| 5,391,417 A | 2/1995 | Pike | |
| 5,449,401 A | 9/1995 | Zuberer | |
| 5,573,586 A | 11/1996 | Yap et al. | |
| 5,672,642 A | 9/1997 | Gros | |
| 5,928,418 A | 7/1999 | Tamaki et al. | |
| 6,011,094 A | 1/2000 | Planche et al. | |
| 6,024,788 A | 2/2000 | Tomioka et al. | |
| 6,087,420 A | 7/2000 | Planche et al. | |
| 6,414,056 B1 * | 7/2002 | Puzic et al. | 524/59 |
| 6,440,205 B1 | 8/2002 | Bailey et al. | |
| 6,579,921 B1 | 6/2003 | Liang et al. | |
| 6,695,902 B2 | 2/2004 | Hemmings et al. | |
| 6,706,108 B2 | 3/2004 | Polston | |
| 6,824,600 B2 | 11/2004 | Bailey et al. | |
| 6,916,863 B2 | 7/2005 | Hemmings et al. | |
| 7,226,500 B2 | 6/2007 | Honma et al. | |
| 7,241,818 B2 | 7/2007 | Hemmings et al. | |
| 7,276,114 B2 | 10/2007 | Polston | |
| 7,758,280 B2 | 7/2010 | Blackmon et al. | |
| 7,879,144 B2 | 2/2011 | Hemmings et al. | |
| 8,062,413 B1 | 11/2011 | Al-Mehthel et al. | |
| 8,283,409 B2 | 10/2012 | Guymon et al. | |
| 2006/0293420 A1 | 12/2006 | Prejean et al. | |
| 2010/0256265 A1 * | 10/2010 | Hussein et al. | 524/59 |
| 2012/0022182 A1 | 1/2012 | Ranka | |
| 2012/0103232 A1 | 5/2012 | Al-Mehthel et al. | |
| 2012/0184650 A1 | 7/2012 | Barnat et al. | |

FOREIGN PATENT DOCUMENTS

| | | |
|---|---|---|
| EP | 0730006 A2 | 9/1996 |
| EP | 1498458 A1 | 1/2005 |
| GB | 2038848 A | 7/1980 |
| WO | 03014231 A1 | 2/2003 |
| WO | 2010/120482 A1 | 10/2010 |
| WO | 2012061371 A1 | 5/2012 |
| WO | 2012061577 A1 | 5/2012 |
| WO | 2013063343 A1 | 5/2013 |
| WO | 2013119789 A1 | 8/2013 |

OTHER PUBLICATIONS

ASTM, "Standard Specification for Asphalt Used in Dampproofing and Waterproofing", ASTM International, 2014, p. 121-122, ASTM International.
International Search Report and Written Opinion for related PCT application PCT/US2014/063597 dated Feb. 17, 2015.
International Search Report and Written Opinion for related PCT application PCT/US2014/063598 dated Feb. 17, 2015.
International Search Report and Written Opinion for related PCT application PCT/US2014/063599 dated Feb. 17, 2015.

\* cited by examiner

*Primary Examiner* — James J Seidleck
*Assistant Examiner* — Deve E Valdez
(74) *Attorney, Agent, or Firm* — Bracewell & Giuliani LLP; Constance Gall Rhebergen; Linda L. Morgan

(57) ABSTRACT

This invention relates to asphalt compositions. More specifically, this invention relates to asphalt compositions including asphalt, heavy oil ash, and sulfur. The invention provides a heavy oil ash asphalt composition that includes a base asphalt, sulfur, and heavy oil ash resulting in improved properties, as well as a method of making the composition. The heavy oil asphalt compositions can be used for asphalt based roofing compositions, damp-proofing compositions, and water proofing materials.

8 Claims, No Drawings

HEAVY OIL ASH IN ROOFING, DAMP-PROOFING, AND WATER PROOFING APPLICATIONS

FIELD OF THE INVENTION

This invention relates to asphalt compositions. More specifically, this invention relates to asphalt roofing compositions including asphalt, heavy oil ash, and sulfur.

BACKGROUND OF THE INVENTION

Typical asphalts are essentially mixtures of bitumen, as binder, with aggregate, in particular filler, sand and stones. There are many different types of asphalts available and their characteristics can vary quite significantly. The design of asphalts for roofing applications is a complex process of selecting and proportioning materials to obtain the desired properties in the finished construction while minimize undesirable characteristics. Asphalt compositions for roofing typically may not include aggregates.

In evaluating and adjusting mix designs, the various components of the asphalt composition are balanced between the stability and durability requirements for the intended use. The final goal of mix design is to achieve a balance among all of the desired properties. Binders and various polymers have been investigated for reaching similar goals, and other modifications have been studied.

Besides performance and environmental issues associated with many types of asphalt modifiers, many of the polymers that are used to modify asphalt compositions are expensive and can be difficult to obtain in remote areas of the world. A need exists for a filler than can be used in asphalt compositions. Historically, limestone powder, limestone dust and cement dust have been used as filler.

The Heavy Oil Fly Ash (OFA) is a black powder waste material that results from burning fuel and cracked fuel oil for power generation and water desalination. The current practice for the disposal of the oil ash is through burying it in special lined and sealed pits which is very costly and requires large area to be reserved as dumping site. Heavy oil fly ash is collected in the electrostatic precipitators (ESP) which are installed on boilers burning residual oil, for air pollution control. Alternative means of disposal or disposition of heavy oil fly ash is also desired, as it will reduce the environmental impact of such processes and reduce costs associated with disposal.

SUMMARY OF THE INVENTION

This invention relates to asphalt compositions. More specifically, this invention relates to asphalt compositions including asphalt, heavy oil ash, and sulfur. The heavy oil asphalt compositions can be used for asphalt based roofing compositions, damp-proofing compositions, and water proofing materials.

An aspect of the invention provides a heavy oil ash asphalt composition that includes a base asphalt, sulfur, and heavy oil ash. The base asphalt has a stiffness. The heavy oil ash, the base asphalt and sulfur are combined to create the heavy oil ash asphalt composition. The heavy oil ash is present in the heavy oil ash asphalt composition in an amount effective to improve stiffness of the heavy oil ash asphalt composition as compared to the stiffness of the base asphalt.

In another aspect, the invention provides a method of making the asphalt heavy oil ash composition. In the method, the base asphalt is heated to its melting point, and sulfur and heavy oil ash are added to the base asphalt heated to its melting point. The asphalt heated to its melting point, the sulfur, and the heavy oil ash are then mixed in a blender with a high shear blade such that intimate mixing of the asphalt, sulfur, and heavy oil ash is achieved.

In another aspect, the invention provides an asphalt based roofing composition. The asphalt based roofing composition has asphalt, a polymer, sulfur, and a heavy oil ash. The asphalt based roofing composition has at least 5 wt. % sulfur, at least 5 wt. % polymer, and at least 10 wt. % heavy oily ash.

DETAILED DESCRIPTION OF THE INVENTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

An aspect of the inventions provides a heavy oil ash asphalt composition that includes a base asphalt, sulfur, and heavy oil ash. The base asphalt has a stiffness. The heavy oil ash, the base asphalt and sulfur are combined to create the heavy oil ash asphalt composition. The heavy oil ash is present in the heavy oil ash asphalt composition in an amount effective to improve stiffness of the heavy oil ash asphalt composition as compared to the stiffness of the base asphalt.

The base asphalt material can be a singular material or a blend of several base asphalts. All asphalts contain asphaltenes. Asphaltenes include clusters of large polycyclic aromatic molecules. The structure of asphaltenes may include, in no particular order or regularity, cyclo-alkanes, cyclo-alkenes, and alkane and alkene chains extending from polycyclic molecules for up to 30 carbons ($C_{30}$) in length. Asphaltenes can also have functional moieties that are capable of reacting with other materials. Functional moieties include alcohols, carboxylic acids, ketones, phenols, amines, amides, sulfides, sulfoxides, sulfones, sulfonic acids, and porphyrin rings chelated with vanadium, nickel, and iron. Asphaltenes can also have heterorganic aromatic rings part of their overall polycyclic structure, including benzothiophene, pyrrole and pyridine rings.

Asphalt is a colloidal dispersion of asphaltenes in a maltenes phase. The maltenes phase, which is more mobile than the asphaltene phase, include asphaltene resins, polar and non-polar aromatics, cyclic saturated hydrocarbons (e.g., naphthenes), and both straight and long-chain saturated hydrocarbons. Although not intending to be bound by theory, it is believed that the polar aromatics in the maltene phase tend to be the dispersing agent for the asphaltenes, interacting with polar functional groups that can exist on asphaltenes. One so inclined can at least partially extract maltenes from the dispersion using an n-alkane-based solvent; asphaltenes resist such treatment.

All asphalts containing asphaltenes are suitable as the base asphalt. Asphaltene concentration can vary in amount and functionality depending on the source of the base asphalt. The asphaltene content of the base asphalt is in the range of from about 0.01% by weight to about 30% by weight of the base asphalt. Suitable base asphalts include those asphalts capable of being "Performance Graded" using the Performance Grade table ("Table 1") of the AASHTO Performance Graded Asphalt Binder Specification M 320.

It should be noted that heavy oil fly ash results from burning fuel oil and is different than coal fly ash that results from burning coal or other similar source. The two are different in terms of chemical composition, physical properties, shape, and source.

In the present invention, the heavy oil fly ash that results from burning of heavy fuel oil is used as a filler in the heavy oil asphalt compositions to improve their properties. In some embodiments, the heavy oil asphalt compositions are used for asphalt based roofing compositions, damp-proofing compositions, and water proofing materials. Use of heavy oil ash increases the stiffness of the asphalt compositions, increases the softening points, and increases bonding to roofing materials. The binder used in such compositions could be asphalt, or modified asphalt with polymers or sulfur.

In some embodiments of the present invention, heavy oil fly ash resulting from burning heavy oil is used as filler in the asphalt-based mix for roofing, waterproofing, and damp-proofing. In some embodiments, the heavy oil fly ash has carbon content of more than 90% which will improve the properties of the asphalt binder. The elemental and chemical compositions of exemplary heavy oil fly ash compositions used in this invention are presented in Table 1 and 2 respectively.

TABLE 1

Elemental composition of OFA

| Element | Weight, % |
| --- | --- |
| Carbon | 92.5 |
| Magnesium | 0.79 |
| Silicon | 0.09 |
| Sulfur | 5.80 |
| Vanadium | 0.61 |

TABLE 2

Chemical composition of OFA

| Parameter | Weight, % |
| --- | --- |
| SiO2 | 1.65 |
| CaO | 0.45 |
| Al2O3 | <0.10 |
| Fe2O3 | 0.47 |
| MgO | 0.48 |
| K2O | 0.03 |
| Na2O | 0.53 |
| V2O5 | 2.65 |
| Sulfur | 9.6 |
| Na2O + (0.658K2O), % | 0.55 |
| Loss on ignition | 60.6 |
| Moisture % | 5.9 |

The high loss of ignition noted in the data in Table 2 relates to the carbon content in the ash.

In further embodiments, the heavy oil ash asphalt composition further includes a polymer. In some embodiments, the polymer is an elastomer. In some embodiments, the polymer is a plastomer.

An elastomer is technically defined as a cross-linked, amorphous polymer that is above its glass transition ($T_g$) temperature; however, most of ordinary skill in the art consider elastomers to be either thermoplastic or thermoset polymers that when a load is applied it will yield and stretch with the load, and it will rebound to its original form when the load is released. Classes of traditional elastomers include diene elastomers, saturated elastomers, thermoplastic elastomers and inorganic elastomers, including silicon and sulfur-based polymers. Elastomers enhance the elastic recovery capacity of the asphalt binder, which makes the asphalt binder resistant to permanent deformation due to physical manipulation.

Unsaturated thermoplastic elastomers, including styrene-butadiene-styrene (SBS) block copolymers, are known as useful polymers for inclusion in asphalt binder for modifying its thermal and physical properties. SBS is recognized for its performance-enhancing benefits in road paving applications. An embodiment of the composition includes where the elastomer comprises an SBS block copolymer. An embodiment of the composition includes where the elastomer consists essentially of the SBS block copolymer. Cross-linking SBS can maintain most of the elasticity of the SBS block copolymer while providing improved temperature resistance.

Plastomers occupy a position between traditional polyolefins and elastomers. Plastomers are a class of polymers that when a load is applied it will yield and stretch (not brittle fracture like a traditional polyolefin such as atactic polypropylene) and will remain in its elongated position when the load is released (unlike an elastomer). Plastomers typically also add the property of high-temperature stiffness similar to a traditional polyolefin, whereas elastomers will begin to flow at lower temperatures. Plastomers can mitigate the potential of permanent deformation and loss of integrity through long-term high temperature exposure, such as what a composition may encounter on roof tops and near appliances that radiate heat. Plastomers are thermoplastic in nature, and therefore will deform in a plastic or viscous manner at melt temperatures of the plastomer and becomes hard and stiff at temperatures below melt.

Examples of useful plastomers include long-chain branched polyolefins, including low-density polyethylenes (LDPE); highly-branched polyolefins, including linear low-density polyethylenes (LLDPE), ethylene/α-olefin(s) copolymers/terpolymers/tetrapolymers, and propylene/α-olefin copolymers/terpolymers/tetrapolymers, where the α-olefin(s) include one or more $C_{3-20}$ olefins, including propylene, butene, hexene, and octene, and the ethylene/propylene comprises at least 50% by weight of the copolymers/terpolymers/tetrapolymers; ethylene butyl acrylates (EBA); and ethylene vinyl acetate (EVA). An embodiment of the sulfur-extended plastomer asphalt binder composition includes where the plastomer is an ethylene vinyl acetate (EVA) polymer. An embodiment of the composition includes where the plastomer consists essentially of an ethylene vinyl acetate (EVA) polymer.

Examples of useful EVA plastomers for the sulfur-extended plastomer asphalt binder include the EVA polymers and the homogeneous sulfur-modified polymers (HSMP) as described in PCT Published Application No. WO 2010/120482 (Hussein, et al.), titled "Sulfur Extended Polymer of use in Asphalt Binder and Road Maintenance". An embodiment of the composition includes where the plastomer is a homogeneous sulfur-modified polymer (HSMP). An embodiment of the composition includes where the plastomer consists essentially of a homogeneous sulfur-modified polymer.

Using heavy oil ash as a filler in asphalt compositions improves desired properties of the asphalt compositions. In some embodiments, the heavy oil ash asphalt composition has heavy oil ash present in an amount effective to increase ductility in the heavy oil ash asphalt composition as compared to the ductility of the base asphalt. In further embodiments, the heavy oil ash asphalt composition has heavy oil ash present in an amount effective to increase bonding of the heavy oil ash asphalt composition when applied to a surface as compared to the bonding of the base asphalt alone. In further embodiments, the heavy oil ash asphalt composition has heavy oil ash present in an amount effective to increase bonding by at least 100%. In further embodiments, the heavy oil ash asphalt composition has heavy oil ash present in an amount effective to increase bonding by at least 500%.

In some embodiments, the heavy oil ash is at least 5 wt. % of the heavy oil ash asphalt composition. In some embodiments, the heavy oil ash is at least 10 wt. % of the heavy oil ash asphalt composition. In further embodiments, the heavy oil ash is at least 15 wt. % of the heavy oil ash asphalt composition. In further embodiments, the heavy oil ash comprises at least 20 wt. % of the heavy oil ash asphalt composition. In still further embodiments, the heavy oil ash is at least 25 wt. % of the heavy oil ash asphalt composition. In some embodiments, the heavy oil ash is at least 30 wt. % of the heavy oil ash asphalt composition.

In another aspect, the invention provides a method of making the asphalt heavy oil ash composition. In the method, the base asphalt is heated to its melting point, and sulfur and heavy oil ash are added to the base asphalt heated to its melting point. The asphalt heated to its melting point, the sulfur, and the heavy oil ash are then mixed in a blender with a high shear blade such that intimate mixing of the asphalt, sulfur, and heavy oil ash is achieved.

In further embodiments, the method further provides adding a polymer to the base asphalt and mixing the base asphalt, the sulfur, the heavy oil ash, and the polymer with the high shear blade such that intimate mixing of the base asphalt, the sulfur, the heavy oil ash, and the polymer is achieved. In some embodiments, the polymer is an elastomer. In some embodiments, the polymer is a plastomer.

In another aspect, the invention provides an asphalt based roofing composition. The asphalt based roofing composition has asphalt, a polymer, sulfur, and a heavy oil ash. The asphalt based roofing composition has at least 5 wt. % sulfur, at least 5 wt. % polymer, and at least 10 wt. % heavy oily ash. In some embodiments, the polymer is an elastomer. In some embodiments, the polymer is a plastomer.

EXAMPLES

The compositions used in the following examples were heated to their melting points as follows: pure asphalt was heated to around 160° C.; modified asphalt with plastomers was heated to around 140° C.; modified asphalt with elastomers was heated to around 180° C.; modified asphalt with plastomer and sulfur was heated to around 140° C.; modified asphalt with elastomer and sulfur was heated to around 140° C.

The asphalt binder for all of the example compositions is a neat Performance Grade asphalt PG 64-10. The elastomer for all of the example compositions including an elastomer is a neat styrene-butadiene-styrene (SBS) block copolymer. The plastomer used for all of the example compositions where it is included is HSMP150 made using the procedures as described in PCT Published Application No. WO 2010/120482 (Hussein, et al.) and has the properties as given in, at least, Tables 3 and 4 and paragraphs [0057-0066] of the specification of Published Application. "HSMP150" is the product of combining as described in the Published Application of 50 wt. % elemental sulfur and 50 wt. % EVA28-150. The EVA copolymer has 28 wt. % vinyl acetate content of the copolymer and a melt flow index of 150 g/10 minutes before forming HSMP150.

The modified asphalt with plastomer and sulfur compositions were prepared as follows. Asphalt was mixed with the plastomer at 140° C. with a blender with high shear blade and a blending speed of 2500 RPM. The sulfur was then introduced to the asphalt plastomer mix and blended until obtaining a uniform composition. The selected filler were then mixed with the binder. In these particular examples, limestone powder, cement dust, and heavy oil fly ash fillers in the range of 10, 15, 20 and 25 wt. % were used.

The modified asphalt with elastomer and sulfur were prepared as follows. Asphalt was mixed with the elastomer at 180° C., and was allowed to cool to a temperature around 140° C. The sulfur was then added and blended with a blender with high shear blade and a blending speed of 2500 RPM introduced to the mix. In these particular examples, limestone powder, cement dust, and heavy oil fly ash fillers in the range of 10, 15, 20 and 25 wt. % were used.

Asphalt compositions made with limestone powder and cement dust were compared to asphalt compositions made with heavy oil fly ash. The compositions were tested to verify their compliance with ASTM D449 and ASTM D032.

The following tests were performed on the compositions: Viscosity, ASTM D440; Penetration tests, ASTM D5; Ductility test, ASTM D113; Softening Points, ASTM D36; Flash points, ASTM D92; Adhesion to the surface, the Bond Strength Test, which is described infra. The resulting data from these tests are report in Tables 3 to 8 following. "No additives" means there is no filler in the composition. The fillers are limestone dust, cement dust or oil fly ash.

The Bond Strength Test is performed using a tensile strength testing apparatus to determine the bond strength of a sample of each experimental composition. The tensile strength testing apparatus measures the maximum stress achieved by an experimental composition that adheres two sample testing plates together that are slowly pulled apart.

The tensile strength testing apparatus for applying the stress to each experimental composition has several portions. The main frame portion consists of two-20 mm thick×75 mm² steel blocks that are spaced at the opposing ends of four 92 mm long cylindrical steel bars. The blocks and bars form a stable equally spaced rectangular frame. The upper block of the main frame has two holes to accommodate rods from the upper portion traversing through the block. A sample grip having a wedged-like edge slot is operable to slidably interlock with an upper sample testing plate is fixed to the upper block using a short steel rod with a spring bearing. The spring bearing assists in mitigating any unnecessary compressive force while the experimental composition is being inserted in the apparatus. The upper portion of the tensile strength testing apparatus consists of a 20 mm thick×70 mm diameter steel cylinder. Two cylindrical rods are attached to the "bottom" side of the two flat ends of the cylinder. The upper portion couples with and traverses vertically through the upper block of the main frame through the two holes using the two cylindrical rods. The upper portion rests on a bearing or spring suspending system that eliminates any additional load on the testing sample due to the weight of the upper portion. A 3.0 mm screw inserted through each of the two cylindrical rods proximate to the distal end of the steel cylinder is operable to fit into a screw bore hole present along the 20 mm side of the lower sample testing plate to secure it to the upper portion. Through the "top" side of the steel cylinder a hydraulic or screw drive device (for example, a CBR Compression machine) is coupled. The force delivered by the drive device is converted into a constant downward linear motion that acts to produce increasing tension in the experimental composition.

The apparatus uses two 30×20×6 mm rectangular sample testing plates bonded together with the tested experimental composition to perform the Bond Strength Test. The contact surface area for each sample testing plates is 600 mm². There are two sample testing plates: an "upper" and "lower" sample plate. Both testing plates are made of aluminum. The upper sample testing plate is grooved along the length of its 30 mm sides such that the top plate is operable to slidably interlock with a receiving sample grip of the tensile strength testing apparatus. The lower sample testing plate has a 3.0 mm diameter screw-fit hole in the center of each 20 mm side such that a retaining screw can brace the lower plate in its relative position. The receiving sample grip holds the upper sample testing plate in position while the lower sample testing plate moves downward in a perpendicular direction to the contact surface area as it is affixed to the two cylindrical rods of the upper portion of the tensile strength testing apparatus.

The experimental composition effectively has the dimensions of 30×20×6 mm and forms within the volume of the two sample testing plates. The testing sample of the experimental composition is prepared using the two sample testing plates. The two sample testing plates are placed perpendicular to one another, spaced 6 mm apart from each contact surface area and fixed into position with the aid of a retainer, forming a gap between the plates. Three sides of the gap between the two sample testing plates are enclosed by a non-sticking paper. The experimental composition is heated to a temperature sufficient for it to flow and to fill the 3600 mm³ sample volume gap without forming spaces or voids between the two testing plates. The experimental composition adheres to the contact surface area of each sample testing plate. Once the gap is filled, the testing sample of the experimental composition and sample testing plates cool together as an assembly before removing the non-sticking paper. Typically, 15 minutes is sufficient for the testing sample of the experimental composition to cool to the touch and stabilize. If necessary, the assembly is cooled for 5 minutes in a freezer after waiting 30 minutes for the assembly to cool sufficiently to peel the non-stick paper. The experimental composition assembly is then introduced into a 25° C. water bath for at least 90 minutes directly before testing.

The Bond Strength Test involves loading the 3600 mm³ test sample of the experimental composition with tension at a rate of 1.27 mm/minute at 25° C. During the Bond Strength Test, the downward motion produces an increasing stress in the experimental composition as it attempts to remain adhered to the two sample testing plates. Load magnitude and deformation are detected during the Bond Strength Test. The drive device detects the tension produced in the experimental composition as the drive device moves at a constant rate downward. The maximum detected force before catastrophic bonding failure for the testing sample and the sample plate surface area is the reported bond strength. The bond strength is presented in kiloNewtons per square meter (kN/m²).

TABLE 3

Viscosity (cP) at 135° C. (20 rpm)

| | Additive Type | | | | | | |
| --- | --- | --- | --- | --- | --- | --- | --- |
| | No Additive | Lime Stone Dust | | | | Cement Dust | |
| Binder Type | 0% | 10% | 15% | 20% | 25% | 10% | 15% |
| Plain Asphalt | 571 | 820 | 850 | 862.5 | 925 | 775 | 875 |
| 10% Sulfur | 562.5 | 450 | 500 | 512.5 | 562.5 | 437.5 | 500 |
| 20% Sulfur | 312.5 | 321 | 352 | 378 | 362.5 | 312.5 | 325 |
| 30% Sulfur | 262.5 | 287.5 | 312.5 | 337.5 | 387.5 | 287.5 | 312.5 |
| 5% Plastomer | 750 | 950 | 987.5 | 1075 | 1188 | 1112 | 1188 |
| 10% Plastomer | 912.5 | 1150 | 1300 | 1400 | 1625 | 1475 | 1638 |
| 5% Elastomer | 7988 | 4563 | 5063 | 10100 | 12487 | 7875 | 8488 |
| 10% Elastomer | >13000 | >13000 | >13000 | >13000 | >13000 | >13000 | >13000 |
| 20% Sulfur + 5% Plastomer | 362.5 | 475 | 512.5 | 575 | 625 | 525 | 562.5 |
| 30% Sulfur + 5% Plastomer | 350 | 500 | 575 | 637.5 | 675 | 562.5 | 662.5 |
| 5% Sulfur + 3% Elastomer | 1500 | 3013 | 2425 | 3100 | 2963 | X | X |
| 5% Sulfur + 5% Elastomer | 6938 | X | X | X | X | X | X |
| 10% Sulfur + 5% Elastomer | X | X | X | X | X | X | X |

| | Additive Type | | | | | |
| --- | --- | --- | --- | --- | --- | --- |
| | Cement Dust | | Oil Fly Ash (OFA) | | | |
| Binder Type | 20% | 25% | 10% | 15% | 20% | 25% |
| Plain Asphalt | 912.5 | 1075 | 1375 | 1775 | 2100 | 4500 |
| 10% Sulfur | 537.5 | 575 | 937.5 | 1300 | 2213 | 3412 |
| 20% Sulfur | 362.5 | 425 | 537.5 | 750 | 1362 | 2700 |
| 30% Sulfur | 325 | 375 | 475 | 825 | 1237 | 2975 |
| 5% Plastomer | 1225 | 1337 | 1300 | 2025 | 3400 | 5525 |
| 10% Plastomer | 2037 | 2300 | 1837 | 2713 | 3900 | 6600 |
| 5% Elastomer | 10125 | 11775 | 12325 | >13000 | >13000 | >13000 |
| 10% Elastomer | >13000 | >13000 | >13000 | >13000 | >13000 | >13000 |
| 20% Sulfur + 5% Plastomer | 650 | 787.5 | 750 | 1087 | 1875 | 3625 |
| 30% Sulfur + 5% Plastomer | 662.5 | 775 | 837.5 | 1362 | 2250 | 3850 |
| 5% Sulfur + 3% Elastomer | X | X | X | X | X | X |

TABLE 3-continued

| | Viscosity (cP) at 135° C. (20 rpm) | | | | | |
|---|---|---|---|---|---|---|
| 5% Sulfur + 5% Elastomer | X | X | X | X | X | X |
| 10% Sulfur + 5% Elastomer | X | X | X | X | X | X |

Note:
Cells labeled with X indicate that resulting blends were stiff and not workable. They could not be handled or tested.

As can be seen from the data in Table 3 above, the viscosity of all compositions was increased with the use of oil fly ash as a filler compared to other types of fillers, such as limestone powder or cement dust.

As can be seen, the use of oil fly ash with 5 wt. % plastomer modified asphalt satisfies the wider range of the roofing materials required by ASTM D312. For example, the cement dust and limestone powder compositions satisfied Type-I roofing

TABLE 4

| | Penetration at 25° C. under 100 g load for 5 sec. | | | | | | | | | | | | |
|---|---|---|---|---|---|---|---|---|---|---|---|---|
| | | Additive Type | | | | | | | | | | | |
| | No | Lime Stone Dust | | | | Cement Dust | | | | Oil Fly Ash (OFA) | | | |
| Composition | Additive | 10% | 15% | 20% | 25% | 10% | 15% | 20% | 25% | 10% | 15% | 20% | 25% |
| Plain Asphalt | 67.6 | 46.1 | 44.5 | 37.7 | 35.9 | 46.9 | 44.5 | 43.8 | 38.8 | 41 | 40.3 | 34.7 | 33.0 |
| 10% Sulfur | 55.9 | 67.8 | 62.7 | 64.9 | 65.7 | 72.5 | 75.9 | 81.5 | 78.8 | 45.8 | 44.1 | 40.1 | 33.7 |
| 20% Sulfur | 65.9 | 73.4 | 72.5 | 70.8 | 67.1 | 86.8 | 92.6 | 82.6 | 82.9 | 54.1 | 45.8 | 41.7 | 35.9 |
| 30% Sulfur | 70.9 | 79.1 | 74.7 | 72.0 | 68.4 | 68.4 | 63.8 | 62.8 | 61.9 | 55.6 | 53.4 | 46.1 | 40.6 |
| 5% Elastomer | 70 | 47.6 | 43.8 | 50.7 | 53.2 | 64.9 | 63.9 | 60.1 | 52 | 48.6 | 41.7 | 34.9 | 31.5 |
| 10% Plastomer | 73.9 | 54.9 | 51.6 | 51.4 | 49.5 | 50 | 45 | 44.4 | 38.5 | 46.8 | 38.8 | 33.8 | 30.9 |
| 5% Elastomer | 24.1 | 33.7 | 31.9 | 25.2 | 23 | 30.3 | 28.2 | 24.4 | 23.4 | 33.7 | 31.9 | 25.2 | 23 |
| 10% Elastomer | 21.6 | 29.2 | 24.2 | 23.5 | 19.4 | 27.3 | 26.8 | 25.9 | 23.7 | 29.2 | 24.2 | 23.5 | 19.4 |
| 20% Sulfur + 5% Plastomer | 85.5 | 58.5 | 56.7 | 54.4 | 51.8 | 54.8 | 64.6 | 60 | 48.1 | 64 | 56.4 | 46.2 | 40.9 |
| 30% Sulfur + 5% Plastomer | 85.2 | 58.9 | 56.2 | 49 | 49.5 | 60.6 | 56.3 | 60.8 | 48.9 | 48.2 | 42.2 | 36.6 | 30.3 |
| 5% sulfur + 5% Elastomer | 30.5 | 32.6 | 34.3 | X | X | 13.5 | X | X | X | 10.9 | X | X | X |
| 5% Sulfur + 3% Elastomer | 41.2 | 39 | 37.6 | 34.5 | 34.4 | X | X | X | X | X | X | X | X |
| 10% Sulfur + 5% Elastomer | 27.3 | X | X | X | X | X | X | X | X | X | X | X | X |

Note:
Cells labeled with X indicate that resulting blends were stiff and not workable. They could not be handled or tested.

As can be seen from the data in Table 4, the use of the oil ash reduced penetration. Thus, the use of oil fly ash as a filler with pure asphalt will satisfy a wider range of the roofing materials required by ASTM D312. The cement dust and limestone powder compositions satisfied Type-I and Type-II roofing materials penetration requirements, while the oil fly ash compositions satisfied Type-I and Type-II and Type-III roofing materials penetration requirements. Additionally, sulfur extended asphalt compositions will not satisfy ASTM D312 requirements for the penetration for roofing unless oil fly ash is used as filler where Type-I is obtained.

materials with respect to the penetration requirements, while the oil fly ash compositions satisfied Type-I and Type-II and Type-III roofing materials.

Additionally, as can be seen from the data, less quantity of oil fly ash was required to achieve the required penetration as compared to other materials.

Additionally, sulfur extended asphalt compositions met Type-II and Type-III penetration requirements for damp proofing, waterproofing (ASMT D449) when oil fly ash was used. Likewise, asphalt compositions with 5 wt. % plastomer satisfied Type-III penetration requirements for damp proofing and waterproofing (ASMT D449) when oil fly ash was used.

TABLE 5

| | Ductility | | | | | | | | | | | | |
|---|---|---|---|---|---|---|---|---|---|---|---|---|
| | | Additive Type | | | | | | | | | | | |
| | No | Lime Stone Dust | | | | Cement Dust | | | | Oil Fly Ash (OFA) | | | |
| Binder Type | Additive | 10% | 15% | 20% | 25% | 10% | 15% | 20% | 25% | 10% | 15% | 20% | 25% |
| Plain Asphalt | 150+ | 94.5 | 70.5 | 66.5 | 31 | 57 | 49.5 | 40 | 35 | 18.9 | 19.4 | 18.1 | 7.7 |
| 10% Sulfur | 104 | 106.4 | 67.5 | 65.5 | 64.3 | 64 | 35.5 | 29.5 | 27 | 29.3 | 24.2 | 23.5 | 8.9 |
| 20% Sulfur | 68 | 57 | 65.5 | 49.5 | 42 | 48.5 | 25.5 | 24 | 23 | 37.2 | 33.2 | 18.7 | 10.4 |

TABLE 5-continued

Ductility

| | | Additive Type | | | | | | | | | | | |
|---|---|---|---|---|---|---|---|---|---|---|---|---|---|
| | No | Lime Stone Dust | | | | Cement Dust | | | | Oil Fly Ash (OFA) | | | |
| Binder Type | Additive | 10% | 15% | 20% | 25% | 10% | 15% | 20% | 25% | 10% | 15% | 20% | 25% |
| 30% Sulfur | 63 | 47.5 | 57 | 42.5 | 36.5 | 22.5 | 22.5 | 16 | 19 | 33.4 | 30.2 | 23.7 | 5.5 |
| 5% Plastomer | 73 | 55.2 | 51.5 | 41 | 38.5 | 20.5 | 20 | 26.5 | 18.3 | 34 | 32.5 | 20.7 | 12 |
| 10% Plastomer | 34.5 | 25.8 | 23.4 | 23 | 21.5 | 14.5 | 10.5 | 10 | 7.4 | 22.2 | 13 | 13 | 5.5 |
| 5% Elastomer | 14.5 | 48 | 34.5 | 7.5 | 4.5 | 8 | 7 | 5.5 | 4.4 | 5.2 | 3.5 | 1.5 | 1 |
| 10% Elastomer | 4 | 5.5 | 7.5 | 6 | 4 | 5.2 | 7.2 | 2.6 | 2.6 | 2.8 | 2.3 | 1.5 | 1.3 |
| 20% Sulfur + 5% Plastomer | 51.5 | 20 | 20.5 | 21.3 | 20 | 20.8 | 20 | 17.8 | 14.5 | 9.5 | 6.5 | 3.5 | 1.5 |
| 30% Sulfur + 5% Plastomer | 44.8 | 20.8 | 19.3 | 19.2 | 20.9 | 23 | 18.8 | 19.8 | 19 | 11 | 4 | 2.5 | 1.5 |
| 5% Sulfur + 3% Elastomer | 71 | 56.5 | 53 | 41.8 | 52.5 | X | X | X | X | X | X | X | X |
| 5% Sulfur + 5% Elastomer | 24 | 111 | X | X | X | X | X | X | X | X | X | X | X |
| 10% Sulfur + 5% Elastomer | 51 | X | X | X | X | X | X | X | X | X | X | X | X |

Note:
Cells labeled with X indicate that resulting blends were stiff and not workable. They could not be handled or tested.

TABLE 6

Softening Points, °C.

| | | Additive Type | | | | | | | | | | | |
|---|---|---|---|---|---|---|---|---|---|---|---|---|---|
| | No | Lime Stone Dust | | | | Cement Dust | | | | Oil Fly Ash (OFA) | | | |
| Binder Type | Additive | 10% | 15% | 20% | 25% | 10% | 15% | 20% | 25% | 10% | 15% | 20% | 25% |
| Plain Asphalt | 52.3 | 56.2 | 56.3 | 57.2 | 59 | 53.6 | 55.1 | 56.1 | 56.3 | 61.8 | 62.2 | 61.2 | 68.1 |
| 10% Sulfur | 52.9 | 47.5 | 48.8 | 48.4 | 47.9 | 47.1 | 48.4 | 50.6 | 49.8 | 53.7 | 54.8 | 59.2 | 61.9 |
| 20% Sulfur | 48.5 | 47.3 | 48.5 | 49.2 | 50.2 | 50.6 | 51 | 52.1 | 52.3 | 53.2 | 54.6 | 60.3 | 64.1 |
| 30% Sulfur | 45.1 | 48.4 | 49.1 | 51.3 | 52.1 | 51.9 | 52.2 | 53.6 | 54.8 | 50.4 | 53.8 | 58.2 | 64.2 |
| 5% Plastomer | 54.1 | 54 | 54.2 | 57.3 | 58.9 | 59.9 | 58.8 | 59 | 58.8 | 55.3 | 59 | 64 | 67.7 |
| 10% Plastomer | 56.7 | 58.4 | 60 | 59.3 | 60.4 | 61.7 | 61.8 | 63.4 | 63.5 | 59.6 | 62.1 | 63.7 | 68.1 |
| 5% Elastomer | 86.9 | 82.2 | 83.8 | 87.4 | 89.5 | 82 | 83.4 | 85.6 | 87.1 | 85 | 84.5 | 92.1 | 95 |
| 10% Elastomer | 106.9 | 91.4 | 92.7 | 93.4 | 94 | 88.9 | 90.7 | 100.3 | 101.2 | 92.5 | 93.3 | 95 | 96.6 |
| 20% Sulfur + 5% Plastomer | 53.5 | 57.4 | 56.7 | 57.6 | 57.6 | 56.9 | 57.2 | 59.8 | 59.4 | 61 | 62.6 | 64.7 | 69.9 |
| 30% Sulfur + 5% Plastomer | 52.9 | 57.4 | 57.4 | 58.8 | 59.4 | 59.7 | 59.1 | 60.1 | 59.9 | 61 | 64 | 67.6 | 71.2 |
| 5% Sulfur + 3% Elastomer | 62 | 59.6 | 57.7 | 60.5 | 59.1 | X | X | X | X | X | X | X | X |
| 5% Sulfur + 5% Elastomer | 81.4 | 82.6 | 81.4 | X | X | 81 | X | X | X | 84.7 | X | X | X |
| 10% Sulfur + 3% Elastomer | 75.5 | X | X | X | X | X | X | X | X | X | X | X | X |

Note:
Cells labeled with X indicate that resulting blends were stiff and not workable. They could not be handled or tested.

As can be seen from the data in Table 6, oil fly ash increased softening points of all compositions as compared to other types of materials. This will increase the range of applications of use for oil fly ash compositions. The sulfur extended compositions required the use of the oil fly ash to satisfy the ASTM D312 requirements for softening points. Pure asphalt, SEA, modified asphalt with 5 wt. % polymer, and modified asphalt with 5 wt. % polymer and plastomer compositions all required the use of oil fly ash to satisfy ASTM D449 softening point requirement for type-II damp proofing water proofing material.

TABLE 7

Flash Points ° C.

| Binder Type | No. Additive | Lime Stone Dust | | | | Cement Dust | | | | Oil Fly Ash (OFA) | | | |
|---|---|---|---|---|---|---|---|---|---|---|---|---|---|
| | | 10% | 15% | 20% | 25% | 10% | 15% | 20% | 25% | 10% | 15% | 20% | 25% |
| Plain Asphalt | 338 | 345 | X | X | 345 | 342 | X | X | 315 | 335 | X | X | 340 |
| 10% Sulfur | 210 | 220 | X | X | 220 | 210 | X | X | 190 | 192 | X | X | 190 |
| 20% Sulfur | 205 | 215 | X | X | 215 | 200 | X | X | 170 | 190 | 195 | X | 193 |
| 30% Sulfur | X | 210 | X | X | 215 | 195 | X | X | 175 | 185 | 190 | X | 192 |
| 5% Plastomer | 200 | 195 | X | X | 197 | 195 | X | X | 205 | 208 | X | X | 198 |
| 10% Plastomer | 200 | 170 | X | X | 180 | 180 | X | X | 190 | 177 | X | X | 185 |
| 5% Elastomer | 330 | 330 | X | X | 320 | 280 | X | X | 240 | 285 | X | X | 250 |
| 10% Elastomer | 330 | 315 | X | X | 315 | 300 | X | X | 280 | 285 | X | X | 290 |
| 20% Sulfur + 5% Plastomer | 140 | 155 | X | X | 160 | 170 | X | X | 180 | 185 | X | X | 180 |
| 30% Sulfur + 5% Plastomer | 150 | 170 | X | X | 185 | 170 | X | X | 160 | 185 | X | X | 187 |
| 5% Sulfur + 5% Elastomer | 150 | X | X | X | X | X | X | X | X | X | X | X | X |
| 5% Sulfur + 3% Elastomer | 180 | X | X | X | X | X | X | X | X | X | X | X | X |
| 10% Sulfur + 3% Elastomer | X | X | X | X | X | X | X | X | X | X | X | X | X |

Note:
Cells labeled with X indicate that resulting blends ere stiff and not workable. They could not be handled or tested.

TABLE 8

Bond strength at 25° C. (kN/m$^2$).

| Binder Type | 0% additive | Lime Stone Dust 25% | Cement 25% | Oil Fly Ash 25% |
|---|---|---|---|---|
| Plain Asphalt | 25.83 | 55 | 59.17 | 306.67 |
| 10% Sulfur | 28.33 | X | X | X |
| 20% Sulfur | 33.33 | X | X | X |
| 30% Sulfur | 31.66 | 23.33 | 19.17 | 63.33 |
| 5% Plastomer | 23.33 | X | X | X |
| 10% Plastomer | 33.33 | X | X | X |
| 3% Elastomer | 70 | X | X | X |
| 5% Elastomer | 105 | 302.5 | 286.67 | 495.83 |
| 10% Elastomer | 190 | X | X | X |
| 5% sulfur + 3% Elastomer | 33.33 | X | X | X |
| 5% Sulfur + 5% Elastomer | 155 | X | X | X |

Note:
Cells labeled with X indicate samples that are not tested.

As can be seen from the data in Table 8, oil fly ash increased the bonding to aluminum as follows. With plain asphalt, the use of 25 wt. % oil ash as filler increased the bond between the mortar and aluminum surfaces by more than 500% compared to limestone powder and cement dust compositions. With the 30/70 wt. %/wt. % sulfur/asphalt, the use of 25 wt. % oil ash as filler increased the bond between the mortar and aluminum surfaces by more than 200% and 300% compared to limestone powder and cement dust compositions respectively. The use of oil ash at 25 wt. % as filler with elastomer modified asphalt increased the bond between the mortar and aluminum surfaces by more than 400% compared to limestone powder and cement dust compositions.

Table 9 shows the coal fly ash composition physical properties, which differ from those of heavy oily fly ash compositions described previously. For instance, a coal fly ash composition had a softening point of 57° C. as compared to 62° C. to 68° C. for oil fly ash compositions. Coal fly ash compositions had ductility ranging from 48 cm at 10 wt. % fly ash to 27 cm at 25 wt. % fly ash as compared to 18.9 cm at 10 wt. % oil fly ash to 7.7 cm at 25 wt. % oil fly ash compositions. Coal fly ash compositions had penetrations ranging from 41.8 dmm at 10 wt. % coal fly ash to 43.6 dmm at 25 wt. % coal fly ash as compared to 41 dmm at 10 wt. % oil fly ash to 33 dmm at 25 wt. % oil fly ash compositions. Coal fly ash compositions had viscosities at 135° C. ranging from 812.5 cP at 10 wt. % fly ash to 1087 cP at 2 wt. % coal fly ash as compared to 1375 cP at 10 wt. % oil fly ash to 4500 cP at 25 wt. % oil fly ash compositions. Additionally, 25 wt. % coal fly ash compositions had bond strength to aluminum surfaces of 30.0 kN/m$^2$ as compared to 306.67 kN/m$^2$ for oil fly ash compositions.

TABLE 9

Coal fly ash/asphalt composition properties

| | % Coal Fly Ash | | | | |
|---|---|---|---|---|---|
| | 0% | 10% | 15% | 20% | 25% |
| Softening point (° C.) | 52.3 | 57 | 56.4 | 57.1 | 57.1 |
| Ductility (cm) | 150+ | 48 | 42.5 | 37 | 27 |
| Penetration (dmm) | 68 | 41.8 | 45.3 | 41.3 | 43.6 |
| Viscosity (cP) | 575 | 812.5 | 937.5 | 1025 | 1087 |
| Flash point (° C.) | 337 | ** | ** | ** | 334 |
| Bond Strength (kN/m$^2$) | ** | ** | ** | ** | 30.0 |

TABLE 10

Bond strength using Bond Strength Test with different types of fillers

| Bond Strength (kN/m$^2$) | Coal Fly Ash | CKD | LMD | HOFA |
|---|---|---|---|---|
| At 25% filler content | 30.0 | 59.17 | 55 | 306.67 |

Tables 9 and 10 show that coal fly ash is not as good as oil fly ash. Table 9 and 10 present the results when coal fly ash is used as a filler in lieu of oil fly ash. Table 9 shows the properties of several experimental coal fly ash/asphalt compositions. Table 10 show the results of several Bond Strength Tests. The bond strength at 25 wt. % content was tested for coal fly ash; cement kiln dust (CKD), a type of dust similar to cement dust; limestone dust (LMD); and heavy oil fly ash (HOFA). The results of Table 10 show that coal fly ash composition does not produce as good bond strength as the similar heavy oil fly ash composition. As can be seen from the results in Table 10, the bond strength value for the heavy oil fly ash composition is significantly higher than that of any other composition tested.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Ranges may be expressed herein as from about one particular value, and/or to about another particular value. When such a range is expressed, it is to be understood that another embodiment is from the one particular value and/or to the other particular value, along with all combinations within said range.

As used, the words "comprise," "has," "includes", and all other grammatical variations are each intended to have an open, non-limiting meaning that does not exclude additional elements, components or steps. Embodiments of the present invention may suitably "comprise", "consist" or "consist essentially of" the limiting features disclosed, and may be practiced in the absence of a limiting feature not disclosed. For example, it can be recognized by those skilled in the art that certain steps can be combined into a single step.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

That which is claimed is:

1. A heavy oil ash asphalt composition comprising:
    a base asphalt having a stiffness;
    a styrene-butadiene-styrene (SBS) block copolymer in a concentration range of 5%-10% by weight;
    sulfur in a concentration range of 10%-30% by weight; and
    heavy oil ash in a concentration range of 15%-25% by weight;
    such that the heavy oil ash combines with the base asphalt and sulfur to create the heavy oil ash asphalt composition, where the heavy oil ash is present in the heavy oil ash asphalt composition in an amount effective to improve stiffness of the heavy oil ash asphalt composition as compared to the stiffness of the base asphalt.

2. The composition of claim 1 wherein the heavy oil ash has a carbon content of more than 90% by weight (wt. %).

3. The composition of claim 1 wherein the heavy oil ash is present in an amount effective to increase bonding strength over the base asphalt by at least 100%.

4. The composition of claim 1 wherein the heavy oil ash is present in an amount effective to increase bonding strength over the base asphalt by at least 500%.

5. A method of making the asphalt heavy oil ash composition of claim 1, comprising the steps of:
    heating the base asphalt to its melting point,
    adding a styrene-butadiene-styrene (SBS) block copolymer to the base asphalt
    adding the sulfur to the base asphalt,
    adding the heavy oil ash to the base asphalt, and
    mixing the asphalt heated to its melting point, the sulfur, and the heavy oil ash in a blender with a high shear blade such that intimate mixing of the asphalt, sulfur, and heavy oil ash is achieved.

6. A heavy oil ash asphalt composition comprising:
    a base asphalt having a stiffness;
    an ethyl vinyl acetate (EVA) polymer in a concentration range of 5%-10% by weight;
    sulfur in a concentration range of 10%-30% by weight; and
    heavy oil ash in a concentration range of 15%-25% by weight;
    such that the heavy oil ash combines with the base asphalt and sulfur to create the heavy oil ash asphalt composition, where the heavy oil ash is present in the heavy oil ash asphalt composition in an amount effective to improve stiffness of the heavy oil ash asphalt composition as compared to the stiffness of the base asphalt.

7. The composition of claim 6, wherein the heavy oil ash has a carbon content of more than 90% by weight (wt. %).

8. The composition of claim 6, wherein the heavy oil ash is present in an amount effective to increase bonding strength over the base asphalt by at least 100%.

* * * * *